Sept. 20, 1971    R. L. MARTIN    3,606,377
VEHICLE CRASH RESTRAINT SYSTEM
Filed Nov. 4, 1968    3 Sheets-Sheet 3
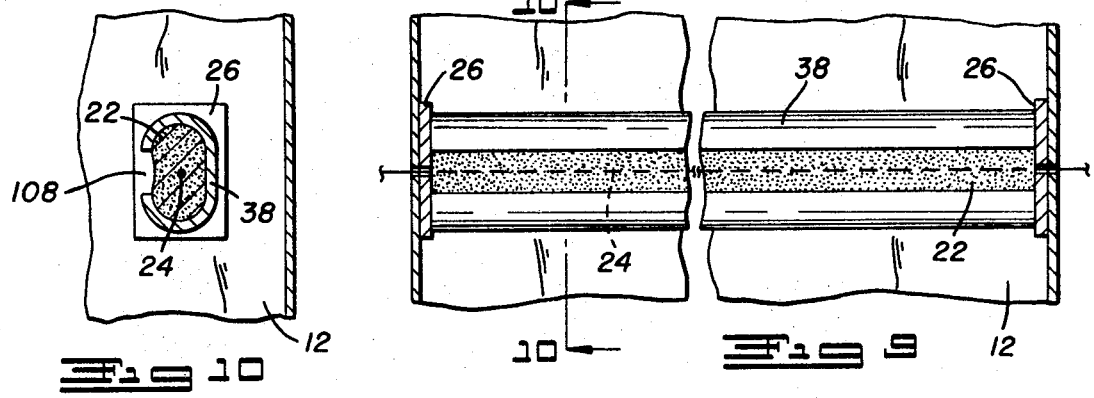
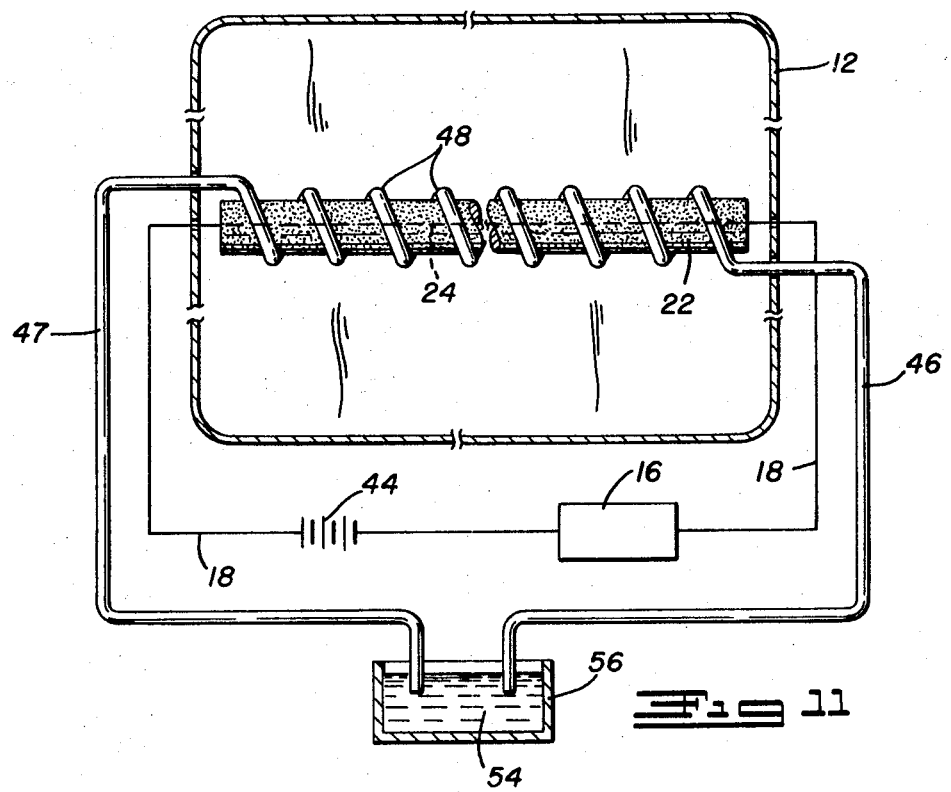
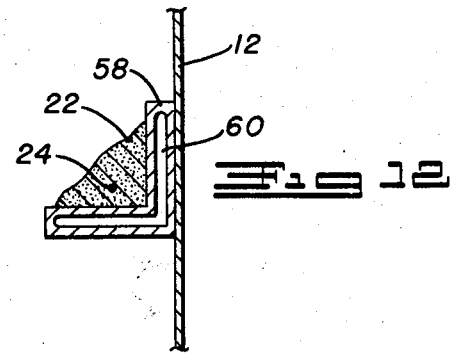
INVENTOR.
ROBERT L. MARTIN
BY
ATTORNEY

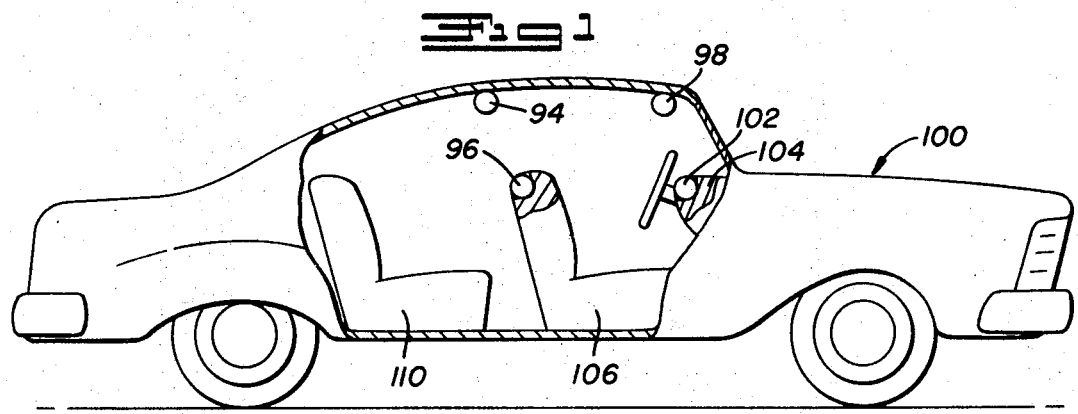
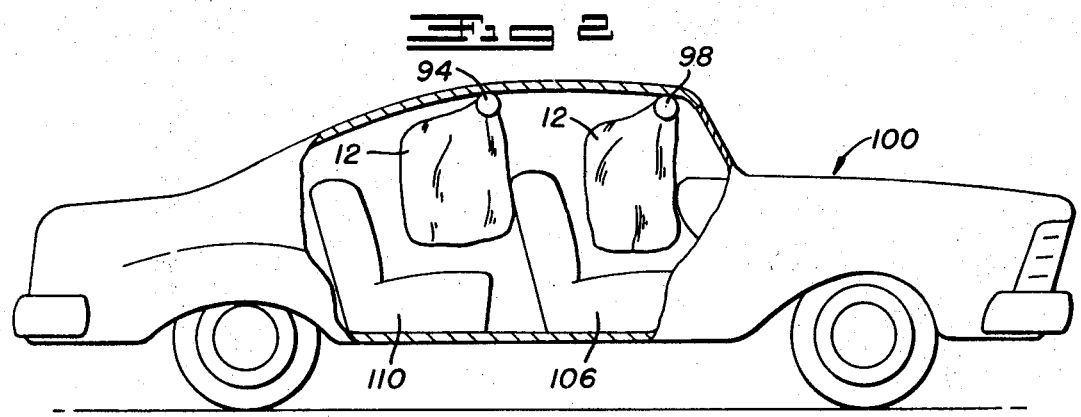
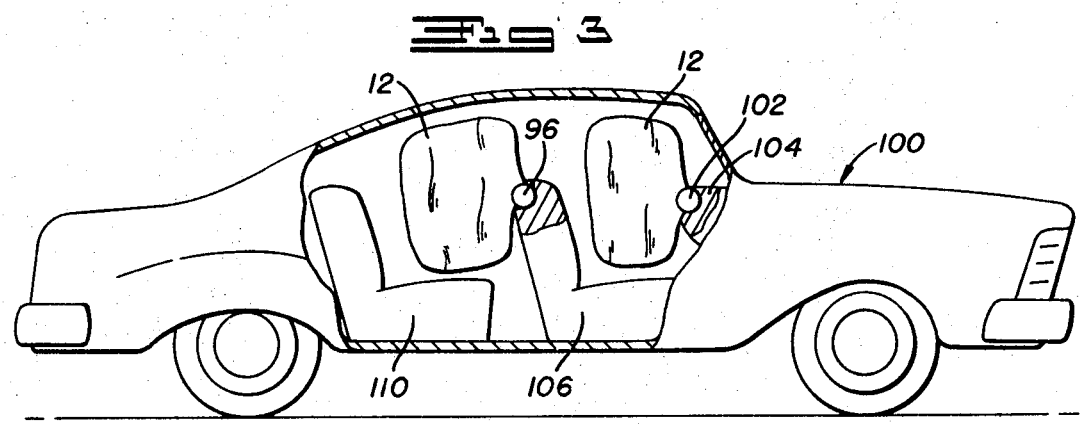

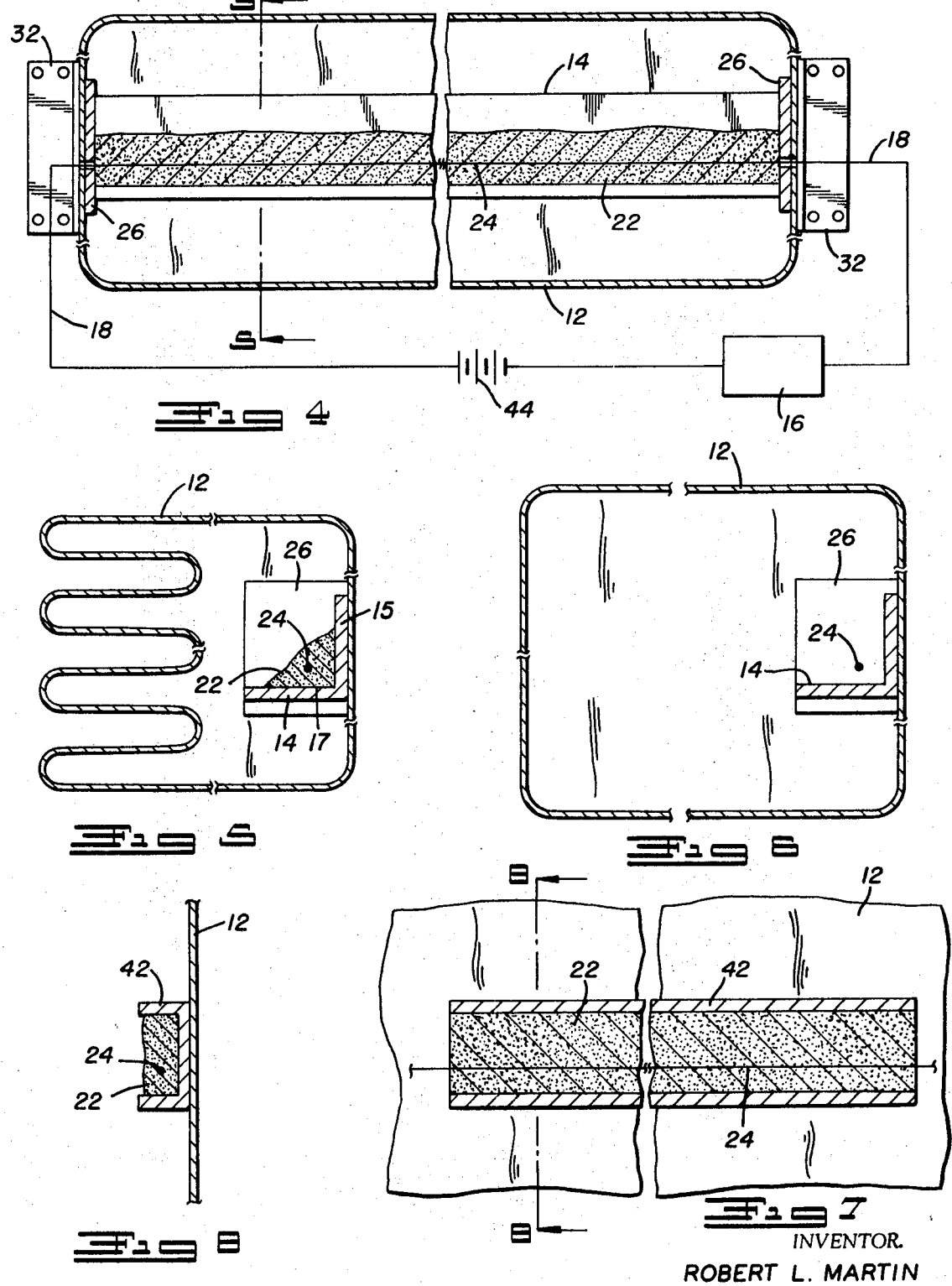

United States Patent Office 3,606,377
Patented Sept. 20, 1971

3,606,377
VEHICLE CRASH RESTRAINT SYSTEM
Robert L. Martin, Detroit, Mich., assignor to Eaton
Yale & Towne Inc., Cleveland, Ohio
Filed Nov. 4, 1968, Ser. No. 773,269
Int. Cl. B06r 21/10
U.S. Cl. 280—150AB                      3 Claims

ABSTRACT OF THE DISCLOSURE

Safety apparatus for protecting an occupant of a vehicle during an acident comprises an inflatable confinement supported on the vehicle. The confinement is supported in an inoperative collapsed condition and is expanded to an operative condition upon the occurrence of an accident. Expansion of the confinement is accomplished by the use of a zero or low pressure gas generating reaction within the confinement which is initiated upon the occurrence of an accident. Cooling means may be employed to absorb the heat resulting from combustion of the fluid generating material.

---

This invention relates generally to a crash restraint system for minimizing injuries to vehicle passengers during accidents. More particularly, this invention relates to a vehicle crash restraint system of the type utilizing a chemical, electrochemical or pyrotechnic reaction to generate a quantity of gas for inflating a confinement in front of a vehicle passenger during an accident for the purpose of safely decelerating and preventing serious injury to the passenger.

The use of inflatable confinements to minimize injury to vehicle passengers during accidents is known and shown in a number of United States patents, including:

| U.S. Pat. No.— | Issued |
|---|---|
| 2,649,311, Hetrick | 8/18/53 |
| 2,755,125, Hodges | 7/17/56 |
| 2,834,606, Bertrand | 5/13/58 |
| 2,850,291, Ziccardi | 9/2/58 |
| 3,197,234, Bertrand | 7/27/65 |
| 3,243,822, Lipkin | 4/5/66 |

All of these patents disclose the use of a gas filled confinement to improve the chances of passenger survival during the occurrence of an accident involving a vehicle. The theory of the gas filled confinement is to utilize a large part of the spatial dimension forward of a vehicle passenger to decelerate the passenger at a rate substantially reduced from that which would occur if the passenger were unrestrained. The application of this theory is disclosed in Bertrand Pat. No. 2,834,606, among others.

Another application of gas filled confinements to minimize injuries to passengers is shown in Hodges Pat. No. 2,755,125 wherein the theory is merely to prevent the passenger from striking a structural member of the vehicle rather than to reduce the deceleration of the passenger over the largest possible distance. Either of these applications is effective to reduce injury to vehicle passengers during an accident and the present invention is applicable to these and other applications.

For the purpose of better understanding, and the establishment of objective criteria in measuring the forces, dynamics and passenger kinematics during the occurrence of an accident, a number of methods are used to simulate vehicle accidents under laboratory conditions. One commonly used method is to crash a representative vehicle into an immovable, unyielding barrier. This destructive method yields results which, after a number of tests with representative vehicles, will be consonant with the results to be expected from an accident involving a particular vehicle. The immovable barrier is used in order to conserve as much of the vehicle kinetic energy as is possible and transform that energy into damage to the vehicle. The barrier collision method is quite effective in damaging the vehicle in that results of many barrier collisions have shown that a vehicle traveling at 30 m.p.h. will sustain as much damage and be decelerated in much the same manner in a barrier collision as will be obtained in an accident involving two similar vehicles head-on at 55 m.p.h. A more recent and more controllable method for establishing passenger dynamics and kinematics has been the use of high acceleration sleds. The sled tests are considerably less destructive than barrier collisions and may be repeated with much more accuracy. The sled tests allow greater control over the variables of vehicle accidents and as a result a great deal of information can be generated in a relatively short time at considerably less expense than would be possible using barrier collisions.

From information already available from tests of the type described above, it has been found that in order to be effective a crash restraint system must be fully operating within a very short period of time. In a 30 m.p.h. barrier or 55 m.p.h. head-on accident, a front seat passenger will begin to move within 50 milliseconds, 0.050 second, or less after the on-set of the accident. In a 60 m.p.h. barrier or 110 m.p.h. head-on accident a front seat passenger will begin to move within 15 milliseconds, 0.015 second, or less after on-set of the accident. Either of the crash situations described above are far too rapid for human actuation of a crash restraint system. Therefore, in order to be effective in minimizing injury to passengers, a crash restraint system must be operable during periods before the occurrence of an accident, or must be fully automatic and become operable within the time existent after on-set of the accident. Known crash restrain systems which are operable pending an accident, such as seat belts, are at present only partly effective to prevent injury to vehicle passengers. A previously inflated gas filled confinement, although completely effective, would probably be objectionable to passengers on many grounds, such systems are shown in the patents, for example, Reeves 1,675,957 issued July 3, 1928, primarily for use in protecting freight from damage.

Crash restraint systems relying on human reaction for actuation such as disclosed in Hetrick 2,649,311 or Lipkin 3,243,822 are impractical since human reaction is on the order of 500 milliseconds, 0.500 second, after realization of an accident as opposed to full operation necessary in at least 50 milliseconds, 0.050 second, after onset of an accident which is necessary to be effective as a crash restraint system.

Another problem heretofore existent in gas filled crash restraint systems is that in order to fill an inflatable confinement in the necessary time and to the volumes necessary to adequately protect passengers, it has been necessary to store the gas at relatively high pressures, either at or near the inflatable confinement. Ziccardi No. 2,850,291 discloses a high pressure container proximate the inflatable confinement and further uses an explosive device to rupture the high pressure container. Ziccardi experiences the problem that in order to function properly, the gas pressure must be maintained in the container over long periods of time since for a given vehicle, crashes are statistically relatively infrequent. The probable consequences of a crash, however, require that the crash restraint system be functional at all times. The maintenance of high pressure fluid without leakage over extended periods of time is the problem to be faced. It is well known, particularly in passenger vehicles, that fluid loss from relatively low pressure systems is a constant problem, even at today's level of pressure seal technology. Therefore, it can be readily expected that the maintenance of high pressure fluid in a system such as Ziccardi would be an even greater problem.

The crash restraint systems of Hetrick No. 2,649,311 Hodges No. 2,755,125 and 2,860,003, Maxwell No. 2,806,737, Bertrand 2,834,606, 2,834,609 and 3,197,234, and Lipkin 3,243,822 also have the problem of high pressure maintenance and the problems attendant thereto.

The prior art, as represented by those patents discussed above, also presents a handling problem, in that, at sometime during the assembly of the crash restraint system the high pressure container must be charged with high pressure fluid. The handling of high pressure fluid containers is relatively dangerous, particularly since the pressure containers for crash restraint systems are made by design such as to discharge upon the happening of a predetermined action.

The crash restraint system of Kobori 3,336,045 uses a gas generating material to inflate the container. However, the Kobori system is subject to problems associated with gas generating materials, specifically, the problem of dealing with the heat created by the combustion of the gas generating material and the possible breadown of the material over a long period of time.

The present invention solves the problems of high pressure fluid storage and handling by providing a zero pressure fluid source capable of filling an inflatable confinement of suitable volume within the time necessary after the occurrence of an accident. The invention embodies the utilization of a chemical gas generating material located within the inflatable confinement and appropriately connected to an energization source for initiating gas generation after the onset of an accident.

The location of the gas generating material within the confinement essentially seals the gas generating material from foreign substances which could contribute to the breakdown of the material and also reduce the time needed to inflate the confinement. The invention further embodies the utilization of cooling means to absorb the heat created by the combustion of the gas generating material and thereby prevent harm to the safety apparatus. The gas generation may be accomplished by chemical, electrochemical or pyrotechnic reaction.

SUMMARY OF THE INVENTION

The present invention is a safety apparatus for use in a vehicle having a zero or low pressure gas generator in an inflatable confinement operable to arrest the movement of passengers during an accident. The gas generation may be accomplished by chemical, electrochemical or pyrotechnic reaction. The gas thus generated as a result of a sensed accident will inflate the confinement to a low pressure. The low pressure confinement will then arrest the movement of a vehicle passenger over a distance and thereby minimize or prevent his injury. The invention represents a significant contribution to the state of the art of crash restraint systems by removing the requirement of handling and storing for extended periods of time high pressure fluid containers, which must, because of the importance of their function, remain at a relatively fixed high pressure or be devoid of value when the occasion for their use arises.

BRIEF DESCRIPTION OF THE DRAWING

The practical physical embodiments of the invention are many and but a few are shown in the accompanying drawing wherein:

FIG. 1 shows a vehicle having an installed inflatable crash restraint system and illustrates several installation positions wherein the system would be effective to minimize injury to passengers during an accident;

FIG. 2 is similar to FIG. 1 showing certain of the inflatable confinements of FIG. 1 in the inflated condition;

FIG. 3 is similar to FIGS. 1 and 2 showing the alternatively positioned inflatable confinments of FIG. 1 in the inflated condition;

FIG. 4 is a longitudinal view showing an inflatable confinement crash restraint system and particularly illustrating the gas generating feature of the invention of the present case;

FIG. 5 is a sectional view of FIG. 4 taken along the line 5—5 with the inflatable confinement is an uninflated condition;

FIG. 6 is similar to FIG. 5 showing the crash restraint inflatable confinement after inflating;

FIG. 7 is a modification of the crash restraint system structure shown in FIG. 4;

FIG. 8 is a sectional view of FIG. 7 taken along the line 8—8;

FIG. 9 is a different modification of the crash restraint system structure shown in FIG. 4;

FIG. 10 is a sectional view taken along the line 10—10 of FIG. 9;

FIG. 11 is another embodiment of the present invention with a cooling feature; and FIG. 12 is a modification of FIG. 5 showing another type of cooling means.

DESCRIPTION OF THE PREFERRED EMBODIMENTS

Reference will now be made to FIGS. 1–12 of the drawing for purposes of explaining the invention and disclosing a preferred embodiment.

FIG. 1 shows a passenger carrying vehicle 100 having a front passenger seat 106 and a rear passenger seat 110. Also shown in FIG. 1 are alternative positions for satisfactory performance of an inflatable crash restraint system. One location could be directly in front of the vehicle passengers, these could be located in the dashboard 104 and in the rear of the front seat 106. The crash restraint systems located in the dishboard 104 and the rear of the front seat 106 are designated as 102 and 96 respectively.

The alternative positions shown in FIG. 1 are in front of and over the passenger carrying seats 106 and 110. The supporting structure for the crash restraint systems 94 and 98 in this alternative position could be vehicle roll bars.

In the event of an accident involving the vehicle, the inflatable confinement 12 would be inflated as is shown in either FIG. 2 or FIG. 3 depending on the original installation position of the system.

When in the positions shown in FIGS. 2 and 3, the inflated confinement 12 forms a flexible barrier to passenger movement and prevents injury to the passengers. The inflatable confinements 12 are flexible, but are of sufficient strength so as to not rupture when a vehicle passenger is moved into contact with the confinement. The effectiveness of inflated confinements in reducing the violence of deceleration during an accident is known and is extensively used in the transportation of fragile freight. The use of inflated confinements to minimize or prevent injury to human cargo in passenger vehicles is disclosed in several patents including Bertrand 2,834,606 and Ziccardi 2,850,291. These patents disclose the expedient of using a high pressure fluid source to rapidly inflate the confinements after the occurrence of an accident. The time to inflate the confinements after an accident occurs varies with the square of the vehicle velocity. For example, a passenger in a vehicle crashed into an immovable barrier at 30 m.p.h. will not begin to feel the effects of the accident for approximately 50 milliseconds, 0.050 second after on-set of the crash, in a 60 m.p.h. barrier crash in a similar vehicle the passenger will begin to feel the effects of the crash in about 12 milliseconds, 0.012 second, after on-set of the crash. A 2 to 1 increase in vehicle velocity results in a 4 to 1 reduction in the time between the crash and the time when the vehicle passenger begins to feel the effects of the crash. The effect of a crash is to suddenly stop the vehicle in which the passenger is riding without a corresponding decrease in the velocity of the passenger. The passenger, therefore, continues at the former velocity of the vehicle until some obstacle is met. This deceleration of the passenger by an obstacle is what results in injury to the passenger. The inflated confinement serves as a soft obstacle in the path of the pasenger movement and serves to gradually decelerate the passenger over a distance. The distance available in present vehicles is sufficient to allow controlled deceleration of the passenger within human tolerances during the most severe accidents. In view of present numbers of fatilities and serious injuries caused by vehicle accidents, it is readily apparent that a workable crash restraint system is of great benefit and value. The inflatable confinement crash restraint systems utilizing a highly pressurized fluid to inflate the larger inflatable confinement have been demonstrated and are workable. However, there are problems associated with handling and maintaining high pressure fluid containers such as leakage and the danger of uncontrolled rupture of the container.

In FIGS. 4, 5, 7, 8, 9, 10, 11 and 12 are disclosed methods of inflating an inflatable confinement within the time allowed without using a high pressure fluid source.

In FIG. 4, a preferred embodiment of the invention is shown. The inflatable confinement crash restraint system or safety apparatus includes an electrical energy source such as a battery 44 connected electrically in series with an accident sensor 16. The accident sensor 16 may be of any suitable type, such as an inertia sensing device. The function of the accident sensor 16 is to detect the occurrence of an accident and energize an electrical circuit 18. Also in the electrical circuit 18 is an igniter 24, such as a resistance wire or spark discharge apparatus. When an accident is sensed by the accident sensor 16, the electrical circuit 18 is completed and the electrical energy available from the source 44 is transformed into heat energy by the igniter 24.

In contact with the igniter 24 is a pyrotechnic gas generating material 22, such as Arcite 479, manufactured by Atlantic Research Corporation or other equivalent substances. When an accident is sensed and the electric circuit 18 is energized, the heat energy generated by the igniter 24 causes the gas generating material 22 to ignite and be consumed by combustion. As a result of this combustion, a large volume of zero or low pressure gas is generated. The gas generating material 22 is supported by means 14 which will allow free expansion of the gas generated while giving direction to the gas flow away from the support means 14.

The gas generating material 22 is supported by the support means 14 and is substantially shaped thereby. As illustrated in FIG. 4, the support means 14 is an elongated angle member having intersecting walls 15, 17. The gas generating material is supported on the intersecting walls 15, 17 and is also of an elongated shape extending transverse to the direction of expansion of the confinement. The use of an elongated shaped gas generating material allows a large surface area of the material 22 to be in direct communication with the interior of the confinement 12. The provision of a large surface area on the gas generating material 22 provides for rapid and efficient combustion of the material 22 to inflate the confinement 12. Moreover, the provision of a large surface area on the gas generating material 22 allows for the elimination of a diffuser member; as when the gas generating material is ignited, it will tend to produce gas over a large cross-sectional area of the confinement 12. As the gas is generated, the walls 15, 17, which are transverse to the direction of expansion, direct the gas flow without inhibiting the free expansion of the gas. Therefore, the gas will be generated and dispersed throughout the longitudinal cross-sectional area of the confinement 12 from the walls 15, 17 of the support means 14 to inflate the confinement evenly. This is a substantial improvement over the known prior art because the need for a diffuser member is eliminated and the confinement 12 is expanded evenly throughout.

The support means 14 is attached to end plates 26 at both ends. Surrounding the assembly of igniting means 24, pyrotechnic material 22, support means 14 and end plates 26 is an inflatable confinement 12. The inflatable confinement 12 is normally deflated and folded as shown in FIG. 4. Mounting brackets 32 are provided on the above-described assembly for purposes of mounting the assembly of the vehicle.

The location of the gas generating material with relation to the interior of the inflatable confinement 12 is exceedingly important. As previously discussed hereinabove, in a 55 m.p.h. head-on accident a front seat passenger will begin to move within 50 milliseconds, 0.050 second, or less after the onset of the accident. In order to provide for an effective crash restraint system using an inflatable confinement, the confinement must be inflated before 50 milliseconds, 0.050 second, after the onset of an accident. Thus, the time it takes for the gas to reach the interior of the confinement and inflate the confinement is of a critical value. Known crash restraint systems provide means whereby gas enters the confinement from a location disposed away from the interior of the confinement. Thus, the time it takes the gas to reach the interior of the confinement from a location disposed away from the confinement, although on the order of milliseconds, is of a critical value, since the whole operation of sensing an accident, activating the crash restraint system, delivering the gas to the interior of the confinement and inflating the confinement must take less than 50 milliseconds. Moreover, if the accident occurs at a speed greater than 55 m.p.h., the operation must take less time in order for the crash restraint system to be effective. Thus, the provision of locating the gas generating material 22 within the interior of the confinement 12, as shown in FIG. 4, reduces the time needed for inflation of the confinement 12. The time needed to deliver the gas to the confinement is eliminated as the gas is generated in the interior of the confinement 12 and need not be delivered thereto. Moreover, by locating the material within the confinement, the problem of gas leaking from the system as it travels from the fluid container to the interior of the confinement is alleviated.

A further advantage of locating the gas generating material within the confinement is that the gas generating material is substantially sealed from foreign substances which could have a harmful effect on the combustible qualities of the gas generating materials. For example, water, if allowed to reach the gas generating material, could possibly render it incapable of combustion, or constant exposure to air might cause a shortening of the useful life of the material or a complete breakdown thereof. However, by enclosing the gas generating material within the inflatable confinement, the material is essentially sealed from all harmful elements which could be detrimental to it.

The operation of the safety apparatus should be clear from the above. When the accident sensor 16 senses the occurrence of an accident, the electrical circuit 18 is energized by an electrical energy source 44. The electric current in circuit 18 is transformed into heat energy by an igniter 24 located contiguous to the pyrotechnic gas generating material 22. The heat energy ignites the pyrotechnic material 22 and the generated gas fills the inflatable confinement 12 to a predetermined low pressure. When inflated, as shown in FIG. 6, the inflatable confinement 12 serves as a flexible barrier to vehicle passenger movement during an accident and prevents passenger injury by providing means to decelerate passengers within human tolerances.

An important feature of this invention is the utilization of the gas generating material 22 as a source of the gas volume necessary to fill the inflatable confinement 12. Various pyrotechnic materials are available which will generate a sufficient amount of low pressure gas, between 4 and 10 cubic feet at 0 to 5 p.s.i.g., within the requisite time of 10 to 50 milliseconds or less. A typical example of a satisfactory pyrotechnic gas is a generating material, such as Arcite 479, a product of the Atlantic Research Corporation.

FIGS. 7 and 8 are a modified form of the preferred embodiment wherein the pyrotechnic support means 42 is in the form of a modified C-section, such as to provide greater gas flow control as the generating material 22 is combusted. FIGS. 9 and 10 show a further modification of the preferred embodiment wherein the pyrotechnic gas generating support means 38 is a C-section, where the mouth 108 of the C-section is used to control the fluid flow into the inflatable confinement 12. In FIGS 7, 8, 9 and 10, the pyrotechnic support means are mounted relative to the inflatable confinement 12, the vehicle, and the source of electrical power 44 similarly to the method shown in FIG. 4.

Since the generation of gas in accordance with the present invention utilizes the combustion of a gas generating material, it may be required that the pyrotechnic support means be cooled during generation of gas so as to partially absorb the heat of combustion. The heat caused by the combustion of the gas generating material can, if not controlled, cause failure of the safety apparatus. The heat could cause the confinement 12 to ignite or it could cause it to become brittle and thus rupture prematurely. In either case, the safety apparatus would be rendered inoperative. Moreover, the heat generated could have a detrimental effect on the occupant if allowed to accumulate. Therefore, means for absorbing the heat of combustion are shown in the embodiments of FIGS. 11 and 12.

The need for cooling will be substantially dependent upon the composition of the material used to construct the inflatable confinement means and the burning temperature of the specific gas generating material used.

In FIG. 11, the gas generating material 22 is supported by coils 48 of a thermosiphon mechanism. As the gas generating material 22 is burned, liquid 54 in the tubes 46, 47 and 48 and contained in a reservoir 56 is caused to circulate in a well-known manner and the heat of combustion is transferred away from the area of the coils 48 to prevent damage from heat to the inflatable confinement 12. Of course, a similar embodiment could be provided where the circulation of the cooling liquid 54 could be accomplished by more conventional means, such as a pump (not shown).

In FIG. 12, the pyrotechnic support means 58 is provided with an internal channel 60 through which a cooling liquid can be pumped by any means to accomplish the transfer of the heat of combustion away from the support means 58 and thereby prevent damage to the inflatable confinement 12 by the development of an inordinate amount of heat.

A further means of absorbing heat generated by combustion of the pyrotechnic gas generating material is the interspersal of liquid containing modules throughout the gas generating material. As the gas generating material is burned, the liquid in the modules is vaporized, thereby absorbing heat. This method of absorbing excessive heat is particularly desirable because of the elimination of external connections with the crash restraint system. Such liquid filled modules are adapted to be used with the systems shown in FIGS. 1-10 as the sole means of absorbing excessive heat, or may be used in combination with other cooling means, as shown in FIGS. 11 and 12. The liquid filled modules can vary in size from small microscopic particles to modules having substantial individual volumes.

It is to be understood that for purposes of visual clarity, the gas generating material 22 is shown in the drawing as having substantial bulk. However, in practice, the gas generating material may take other configurations. A prime consideration in the ability of a gas generating material to fill a confinement with the volume required in the short period of time allowed is the burning rate of the material. The use of the gas generating material in the form of an elongated strip of gas generating material exposes a large surface area of the material to combustion and, therefore, assists in obtaining a high burning rate. It may also be desirable to intersperse an oxidation catalyst throughout the gas generating material in order to obtain more rapid combustion.

Having described my invention, I claim:

1. Safety apparatus for minimizing injury to an occupant of a vehicle during the occurrence of a collision comprising a confinement having a collapsed inoperative condition and an expanded operative condition for restraining movement of the occupant during the collision and means for expanding said confinement to dispose said confinement in said operative condition, said means for expanding said confinement including a fluid generating material in fluid communication with said inflatable confinement, means for initiating combustion of said fluid generating material in response to the occurence of a collision to generate fluid rapidly at a low pressure, and means associated with said fluid generating material for absorbing heat resulting from combustion of said fluid generating material, said last stated means comprising a noncombustible hollow support member and means for directing fluid through said hollow support member, and wherein said support member is operable to support said fluid generating material.

2. Safety apparatus as defined in claim 1 wherein said means for absorbing heat includes cooling coils surrounding said fluid generating material.

3. Safety apparatus as defined in claim 1 wherein said fluid generating material is arranged within said confinement in an elongated configuration and extends substantially transverse to the direction of expansion of said confinement and is operable to effect uniform expansion of said confinement.

References Cited

UNITED STATES PATENTS

| | | | |
|---|---|---|---|
| 3,532,359 | 10/1970 | Teague et al. | 280—150 |
| 3,532,360 | 10/1970 | Leising et al. | 280—150 |
| 2,494,131 | 1/1950 | Jackson et al. | 23—281 |
| 2,850,291 | 9/1958 | Ziccardi | 280—150 |
| 3,066,014 | 11/1962 | White et al. | 23—281 |
| 3,403,625 | 10/1968 | Jacobson et al. | 102—38 |
| 3,414,292 | 12/1968 | Oldberg et al. | 280—150 |
| 3,425,712 | 2/1969 | Berryman | 280—150 |
| 3,450,414 | 6/1969 | Kobori | 280—150 |
| 2,931,665 | 5/1960 | Sandor | 280—150 |

KENNETH H. BETTS, Primary Examiner

U.S. Cl. X.R.

23—281